US012605910B1

(12) United States Patent
Chun et al.

(10) Patent No.: US 12,605,910 B1
(45) Date of Patent: Apr. 21, 2026

(54) VENT PLUG FOR VULCANIZATION

(71) Applicant: DYNAMIC DESIGN CO., LTD.,
Gwangju (KR)

(72) Inventors: Jung Won Chun, Gwangju (KR);
Ki-Seob Lee, Gwangju (KR)

(73) Assignee: Dynamic Design Co., Ltd., Gwangju
(KR)

( * ) Notice: Subject to any disclaimer, the term of this
patent is extended or adjusted under 35
U.S.C. 154(b) by 0 days.

(21) Appl. No.: 19/052,361

(22) Filed: Feb. 13, 2025

(30) Foreign Application Priority Data

Nov. 29, 2024 (KR) ........................ 10-2024-0174622

(51) Int. Cl.
B29D 30/06 (2006.01)
(52) U.S. Cl.
CPC .. B29D 30/0606 (2013.01); *B29D 2030/0617*
(2013.01)
(58) Field of Classification Search
None
See application file for complete search history.

(56) References Cited

U.S. PATENT DOCUMENTS

| | | | | |
|---|---|---|---|---|
| 2008/0279972 A1* | 11/2008 | Seroka | ............... | B29D 30/0606 425/28.1 |
| 2019/0275757 A1 | 9/2019 | Hasselloef et al. | | |
| 2020/0130304 A1* | 4/2020 | Yasunaga | ........... | B29D 30/0606 |
| 2021/0010607 A1 | 1/2021 | Vitek et al. | | |

FOREIGN PATENT DOCUMENTS

| | | | | |
|---|---|---|---|---|
| CN | 201633153 U | 11/2010 | | |
| CN | 112895539 A | * 6/2021 | ......... | B29D 30/0606 |
| EP | 3481624 B1 | 9/2021 | | |
| JP | 2017013312 A | 1/2017 | | |
| JP | 2021115834 A | 8/2021 | | |
| KR | 100873786 B1 | 12/2008 | | |
| KR | 20110005872 U | * 6/2011 | ......... | B29D 30/0606 |
| KR | 10-2015-0105772 A | 9/2015 | | |

(Continued)

OTHER PUBLICATIONS

Wu. CN112895539A. 2021. Machine Translation via ESpaceNet. Accessed Sep. 3, 2025. (Year: 2021).*

(Continued)

*Primary Examiner* — Sedef E Paquette
*Assistant Examiner* — Alexander D Booth
(74) *Attorney, Agent, or Firm* — Temmerman Law;
Mathew J. Temmerman

(57) ABSTRACT

A vent plug in which air is discharged in a vent formed in a mold as an air discharge port during a vulcanization molding stage for a tire, and rubber for manufacturing a green tire is prevented from inflowing into the vent. The vent plug includes a housing inserted into the vent hole; an actuator installed inside the housing; and an opening/closing drive spring installed inside the housing to provide an elastic force to the actuator, wherein the actuator has a head formed at one end thereof, and one end of opposite ends of the spring is caught by a step formed on a bottom inside the housing, and the other end is caught by the head, whereby, when the actuator is inserted into the housing, the opening/closing drive spring is configured to push a portion of the actuator to an outside of the housing.

4 Claims, 10 Drawing Sheets

(56)         References Cited

FOREIGN PATENT DOCUMENTS

| KR | 20-2016-0001348 | A |   | 4/2016 |   |   |
|----|------------------|---|---|--------|---|---|
| KR | 10-2016-0148964 | A |   | 12/2016 |   |   |
| KR | 20160148964 | A | * | 12/2016 | ............ | B29C 33/10 |
| KR | 10-2523548 | B |   | 4/2023 |   |   |
| KR | 10-2024-0010140 | A |   | 1/2024 |   |   |

OTHER PUBLICATIONS

Lee. KR20160148964A. 2016. Machine Translation via ESpaceNet.
Accessed Sep. 3, 2025. (Year: 2016).*
Lee. KR20110005872U. 2011. Machine Translation via ESpaceNet.
Accessed Sep. 3, 2025. (Year: 2011).*

* cited by examiner

[FIG. 1]
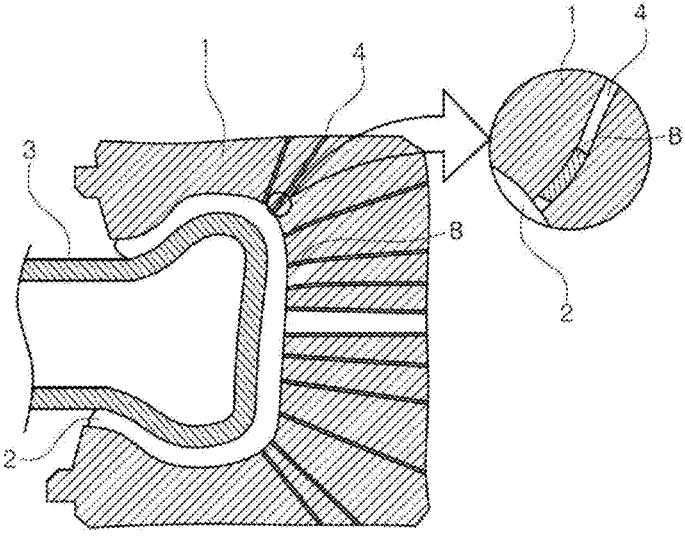
[FIG. 2]
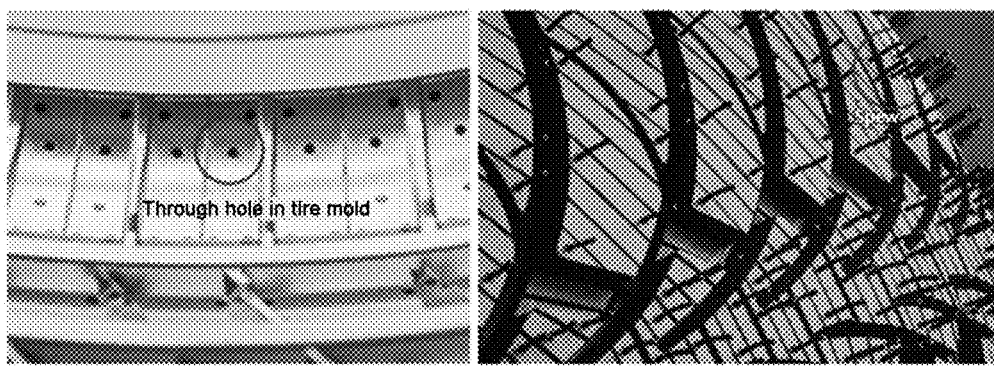
<Photo of tire mold surface>          <Photo of tire surface>

[FIG. 3]
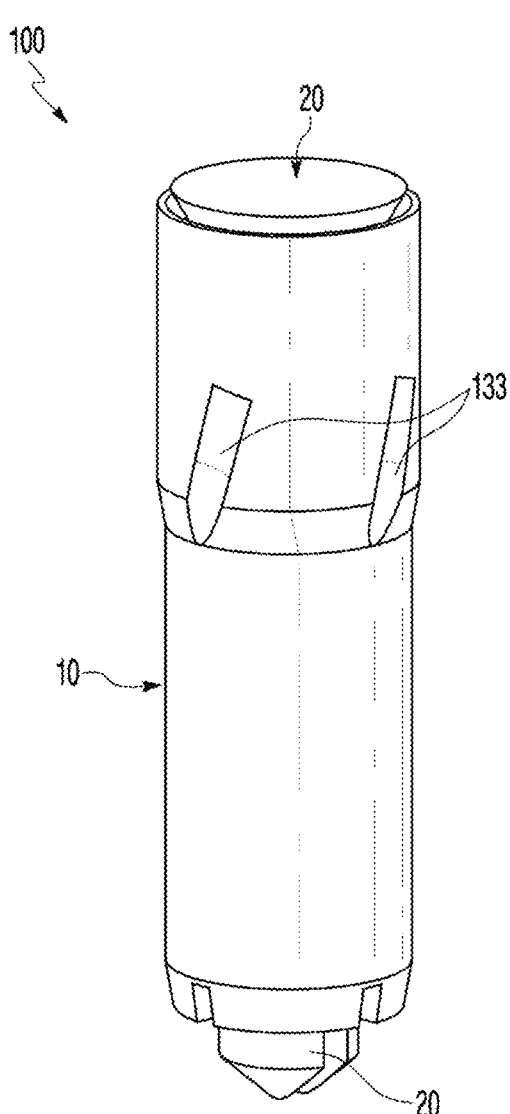

[FIG. 4]
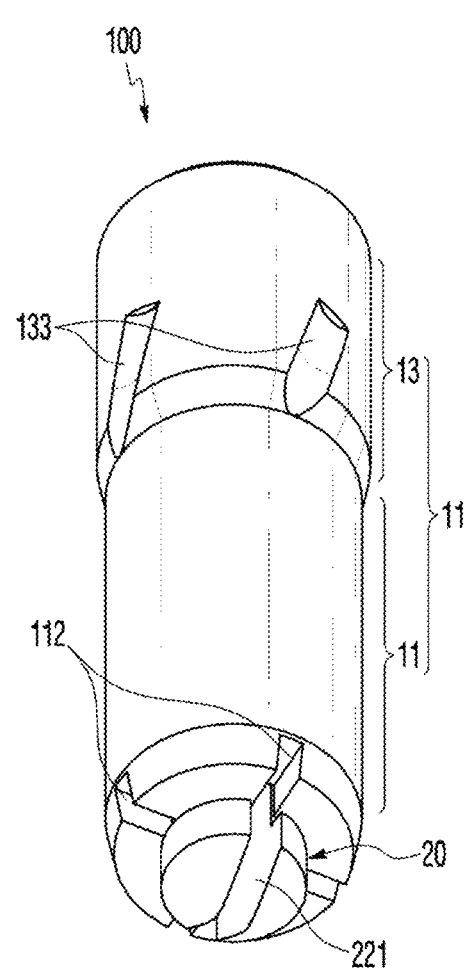

[FIG. 5]
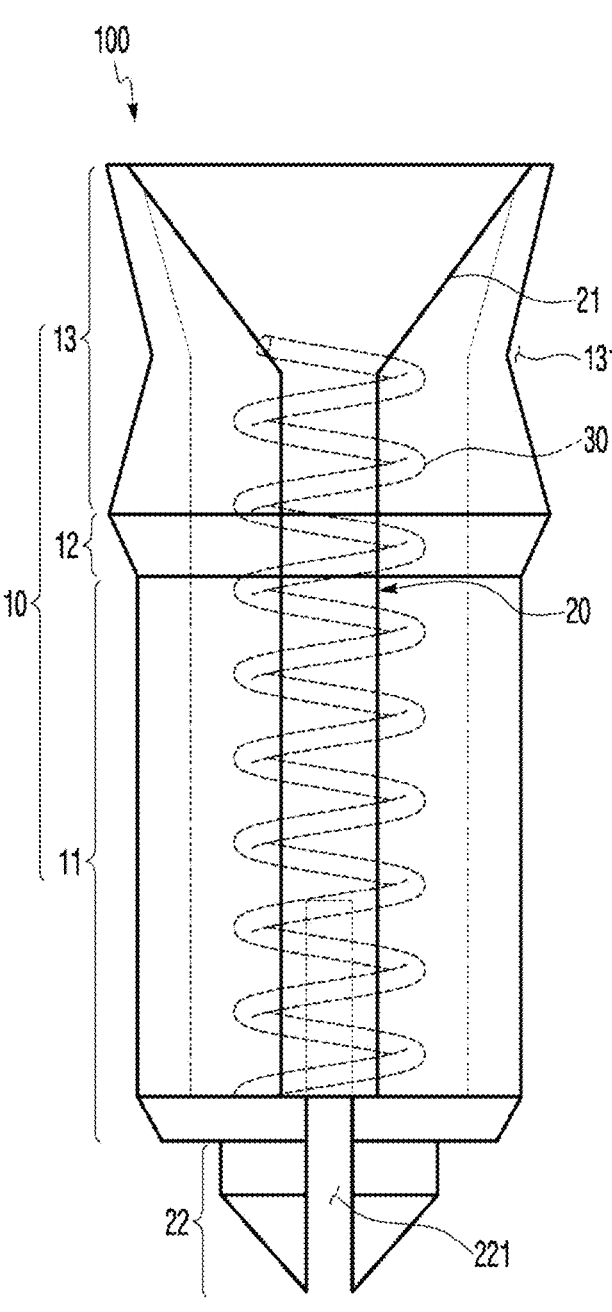

[FIG. 6]
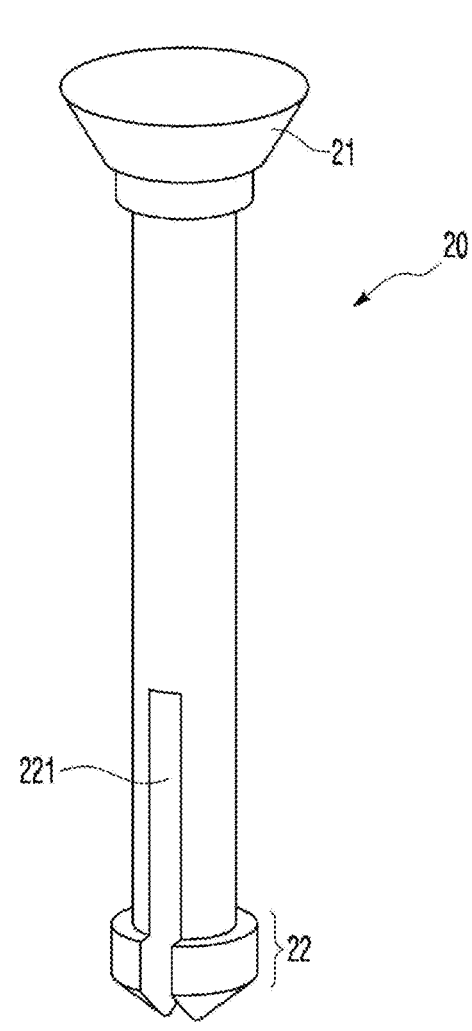

[FIG. 7]
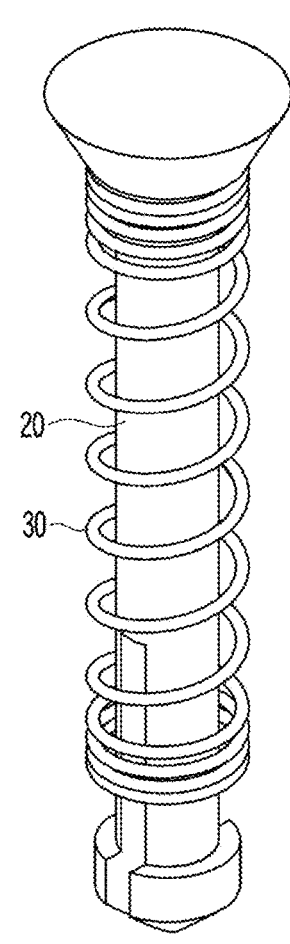

[FIG. 8]

[FIG. 9]
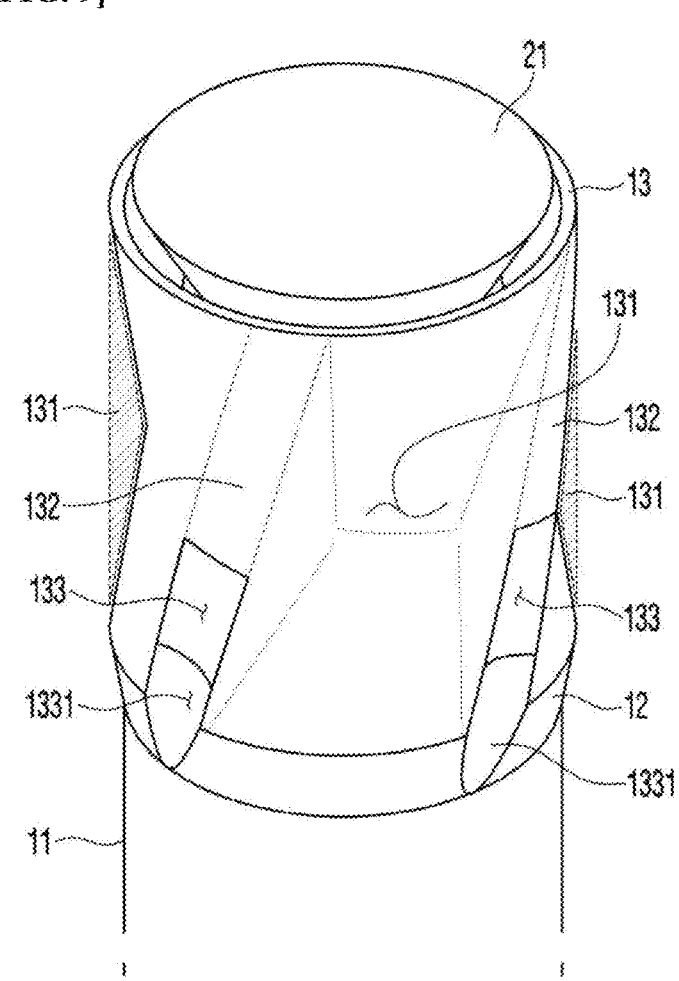

[FIG. 10]
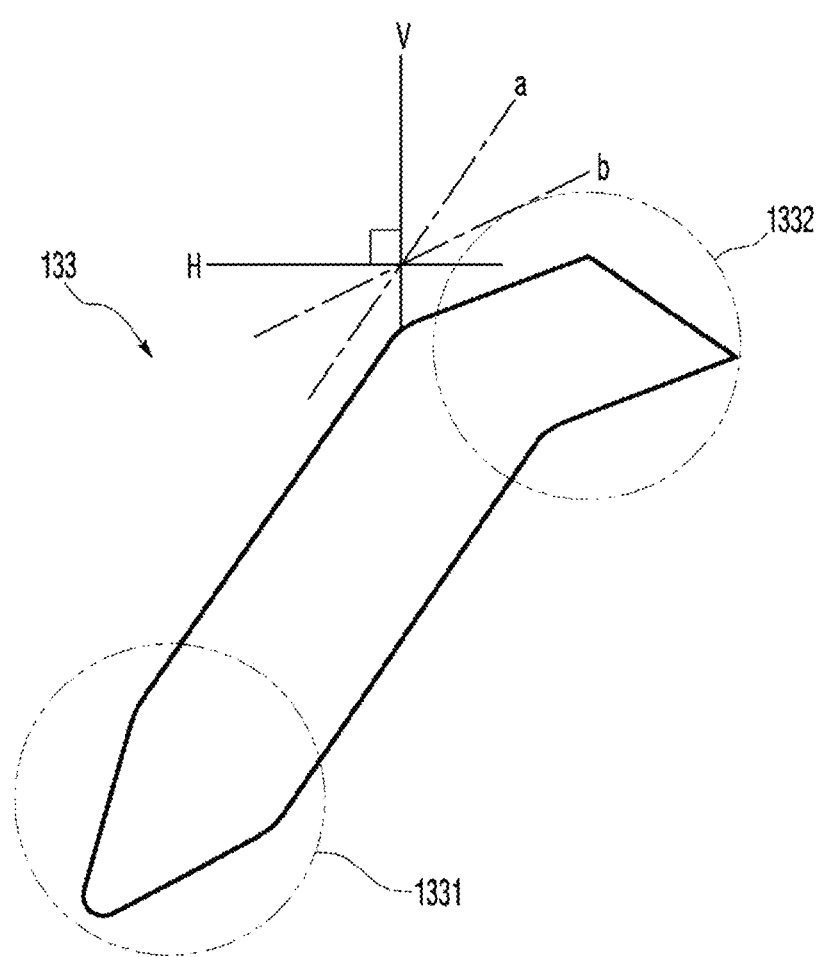

[FIG. 11]
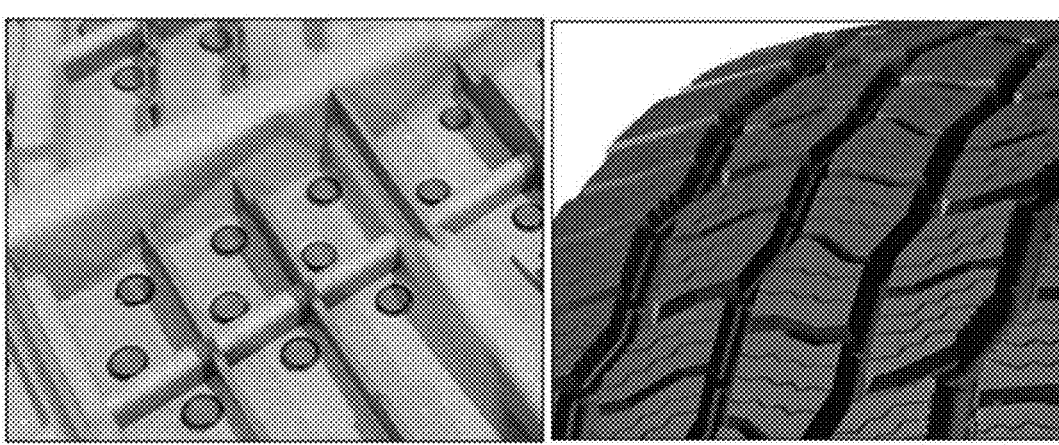
<Photo of tire mold surface with the Spring vent plug applied>          <Photo of tire surface with the Spring vent plug applied>

VENT PLUG FOR VULCANIZATION

CROSS REFERENCE TO RELATED APPLICATIONS

This application claims the benefit of Korean Patent Application No. 10-2024-0174622 filed on Nov. 29, 2024, the entirety of which is incorporated by reference herein.

BACKGROUND OF THE INVENTION

1. Field of the Invention

The present invention relates to a vent plug for selectively passing through air and rubber so that the air is discharged in a vent formed in a mold as an air discharge port during a vulcanization molding stage for a tire, and the rubber for manufacturing a green tire is prevented from inflowing into the vent.

2. Description of the Related Art

In a manufacturing process of a tire, vulcanization is an important stage which provides physical strength and durability to the tire. In this process, a green case 2 (unmolded tire or intermediate molded tire) is heated under conditions of specific temperature and pressure inside a tire vulcanization mold 1, and a work for molding it into a finished shape is performed.

A main principle of the vulcanization process will be described with reference to FIG. 1. The green case 2 is disposed inside the vulcanization mold 1, and the vulcanization mold 1 plays a role of forming an appearance of the tire. At this time, when air is injected into an inside of a bladder 3 through the bladder 3, the bladder 3 expands to cause the green case 2 to be expanded, thereby closely contacting the green case 2 with a surface of the vulcanization mold 1.

In this case, if the air remaining between the vulcanization mold 1 and the green case 2 is not effectively discharged, defects (such as air bubbles, etc.) may be generated on the tire surface or molding may not be performed properly.

To prevent this problem, as shown in FIG. 1, the mold includes a vent hole 4 for exhausting air formed therein.

The vent hole 4 allows the air remaining inside the vulcanization mold 1 to be smoothly discharged to an outside, thereby helping the tire have a smooth and perfect appearance in the molding process.

However, in the method of using the vent hole 4, if the vent hole 4 has a large diameter, the air is discharged smoothly, but the rubber for manufacturing the green case 2 penetrates into the vent hole 4, thereby causing a hair-like defect called a "spew" to appear on the tire surface.

This results in a deterioration in the appearance quality of the tire product. To solve this problem, a method of inserting a spring vent plug B into the vent hole 4 is generally used.

A design of the conventional spring vent plug B is intended to provide basic functions of air discharge through the vent hole 4 and prevention of tire rubber penetration, but the following problems occur due to repeated use and thermal-mechanical loads applied thereto.

First, the vent plug B becomes loose and is detached from the vent hole. The tire vulcanization process is carried out at a high temperature of about 200° C., and due to repeated temperature increases and decreases, a contact pressure between the vulcanization mold 1 and the vent plug B is gradually decreased. The conventional vent plug B is installed by forced fit, but the vent plug B becomes loose over time due to vibration and thermal expansion and contraction, and there is a risk of being detached from the vent hole 4. In this case, if the vent plug B is detached, as depicted in the right image of FIG. 2, a hair-like defect called a spew occurs due to the penetration of rubber through the vent hole 4, thereby deteriorating the quality of the tire surface.

Second, maintenance is required due to insufficient fastening force.

The conventional forced fit method relies only on a frictional force between the vent plug B and the vulcanization mold 1. Therefore, if the material of the vulcanization mold 1 is deformed or the contact surface is worn at a high temperature, the fastening force is rapidly decreased. Loosening of the conventional vent plug B causes air leakage during the vulcanization process, and the frequency of work for maintenance of the vulcanization mold 1 is increased.

Third, the efficiency of air discharge is reduced. The simpler the design of the conventional vent plug B, the more limited the air discharge path is. Therefore, the efficiency of air discharge is decreased. As a result, air may remain inside the vulcanization mold 1 during the vulcanization process, which may cause molding defects.

Fourth, a lifespan of the vent plug is shortened due to the repeated use. Thermal and mechanical stresses generated at the contact surface between the vent plug B and the vulcanization mold 1 cause deformation of the conventional vent plug B, and the lifespan of the conventional vent plug B is shortened in the repeated vulcanization process.

Despite these problems, the conventional design lacks a mechanism to solve the above-described problems, and thus remains a problem to be solved.

PRIOR ART DOCUMENT

Patent Document (Patent Document 1) Korean Patent Laid-Open Publication No. 10-2015-0140044 (Publication date: Dec. 15, 2015)

SUMMARY OF THE INVENTION

Accordingly, it is an object of the present invention to provide a vent plug for a vulcanization mold, which has a means capable of firmly maintaining an installation state of the vent plug installed in a vent hole of the vulcanization mold without loosening even after the use time has elapsed, such that the vent plug is prevented from being detached, and maintenance for reinforcing the fastening force is not required, thereby greatly reducing time and effort required for maintenance, increasing the efficiency of air discharge, and having excellent durability due to the extended lifespan even after repeated use.

To achieve the above object, according to an aspect of the present invention, there is provided a vent plug installed in a vent hole formed in a vulcanization mold for molding a green tire and configured to discharge air and prevent a raw rubber of the green tire from inflowing, which includes: a housing inserted into the vent hole; an actuator installed inside the housing; and an opening/closing drive spring installed inside the housing to provide an elastic force to the actuator.

Here, the actuator may have a head formed at one end thereof, and one end of opposite ends of the spring may be caught by a step formed on a bottom inside the housing, and the other end may be caught by the head, whereby, when the actuator is inserted into the housing, the opening/closing drive spring may push a portion of the actuator to an outside of the housing.

Preferably, the housing includes: a body front end and a body rear end which are formed in a longitudinal direction thereof, and an intermediate step which connects the body front end and the body rear end, Preferably, the body front end is first inserted into the vent hole, and then the body rear end is inserted therein, such that the end of the body rear end is installed so as to face the inside of the vulcanization mold.

Preferably, the body rear end is formed to have a larger diameter than the diameter of the vent hole, such that the body rear end is pressed and inserted into the vent hole by forced fit.

Preferably, the housing has a hole at an end of the body front end, wherein the actuator penetrates the hole formed in a surface facing the inside of the vent hole, and exhaust slits which communicate the inside and the outside of the housing are formed at radially symmetrical positions around the hole, whereby air inflowing into the housing from the inside of the vulcanization mold through the body rear end is exhausted to the vent hole through the hole and the exhaust slits.

Preferably, the actuator has a communicating slit formed at a position corresponding to the exhaust slits, whereby, even if the hole is blocked by the end of the actuator, the air inside the housing is exhausted to the vent hole through the communicating slit and the exhaust slits.

Preferably, the body rear end has a concave-convex structure formed on an outer circumference thereof to reinforce coupling between the body rear end and the vent hole in a circumferential direction.

Preferably, the concave-convex structure is tight fitting grooves which are grooves formed in a predetermined length and inserted while a portion of an inner circumference of the vent hole is raised due to a pressure difference generated in a process of the body rear end being pressed and inserted into the vent hole.

Preferably, the tight fitting grooves are formed to be inclined at a predetermined angle with respect to the longitudinal direction of the housing and the vent hole, such that in the process of the body rear end of the housing being pressed and inserted into the vent hole, a trajectory due to the raised portion formed on an inner circumference of the vent hole caused by the tight fitting grooves is formed in a spiral shape.

Preferably, in the intermediate step formed between the body front end and the body rear end of the housing, a step surface defining the intermediate step is formed to be inclined at a predetermined angle from a right angle with respect to the longitudinal direction of the housing, such that the intermediate step is formed in a shape in which a diameter is gradually increased from a point where the body front end ends to a point where the body rear end starts.

Preferably, a starting point of the tight fitting groove is a point where the diameter of the intermediate step starts to increase.

Preferably, the concave-convex structure includes recess portions formed at a predetermined angle on the outer circumference of the body rear end, and protruding portions formed between the adjacent recess portions.

In particular, the concave-convex structure and the above-described tight fitting groove may be formed together. For example, the tight fitting groove may be formed in the protruding portion of the concave-convex structure.

Preferably, the tight fitting groove has an extension section formed at an end thereof, and the extension section is a tight fitting reinforcement section formed to be inclined with respect to the housing at an angle greater than an angle formed by the tight fitting groove with the housing, whereby a strong resistance may be exhibited with respect to a direction where the housing is detached after the housing is coupled to the vent hole.

The vent plug for vulcanization according to the present invention has a means capable of firmly maintaining an installation state of the vent plug without loosening even after the use time has elapsed, such that the vent plug is prevented from being detached, and maintenance for reinforcing the fastening force is not required, thereby greatly reducing time and effort required for maintenance, increasing the efficiency of air discharge, and having excellent durability due to the extended lifespan even after repeated use.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a conceptual view illustrating a position of a vent hole formed in a vulcanization mold;

FIG. 2 is images of a conventional mold and a conventional tire surface;

FIG. 3 is a perspective view of a vent plug according to an embodiment of the present invention;

FIG. 4 is a perspective view of the vent plug depicted at a different angle from FIG. 3;

FIG. 5 is a front three-dimensional view of the vent plug according to an embodiment of the present invention;

FIG. 6 is a perspective view independently illustrating an actuator shown in FIG. 5;

FIG. 7 is a perspective view in which an opening/closing drive spring is coupled to the actuator of FIG. 6;

FIG. 8 is a perspective view independently illustrating a housing shown in FIG. 5;

FIG. 9 is an enlarged perspective view of a portion of the housing shown in FIG. 8;

FIG. 10 is a conceptual view illustrating an additional embodiment of a tight fitting groove shown in FIG. 9; and FIG. 11 is images of a mold and a tire surface after the vent plug of the present invention is applied.

DETAILED DESCRIPTION OF THE INVENTION

First, the terms or words used in the present disclosure and claims should not be construed as limited to a conventional or lexical meaning. Instead, based on a principle that an inventor can desirably define the concept of terms or words to describe his/her invention by means of the most preferable method, the terms or words should be construed as the meanings and concepts in compliance with technical ideas of the present invention.

Accordingly, embodiments described in the present disclosure and configurations shown in the drawings are simply the most preferred embodiment and do not represent all the technical sprites of the present invention, and it will be understood that various modifications and equivalents may be made to take the place of the embodiments at the time of filling the present application.

Hereinafter, preferred embodiments of the present invention will be described in detail with reference to the accompanying drawings. Meanwhile, in the drawings below, sizes of specific components may be expressed relatively exaggeratedly to help understanding of the invention, and in cases where there is no need to distinguish between a plurality of identical components, they may be represented as only one representative component.

Hereinafter, the present invention will be described in detail with reference to the accompanying drawings.

Referring to FIGS. 3 and 5, a vent plug 100 according to an embodiment of the present invention includes a housing 10 to be inserted into a vent hole 4 shown in FIG. 1; an opening/closing actuator 20 movably installed inside the housing 10; and an opening/closing drive spring 30 operably installed inside the housing 10 to provide an elastic force capable of sealing or opening the housing to the opening/closing actuator 20.

In this case, the opening/closing actuator 20 includes a head 21 formed at an end facing an inside of the vulcanization mold 1 shown in FIG. 1. Referring to FIG. 5, one end of opposite ends of the opening/closing drive spring 30 is caught on a step formed on a bottom inside the housing 10, and the other end is caught on the head 21. Accordingly, when the opening/closing actuator 20 is inserted into the housing 10, the opening/closing drive spring 30 is configured to push a portion of the opening/closing actuator 20 to an outside of the housing 10. For reference, the opening/closing actuator 20 includes an extension tip 22 formed at an end on a side opposite to the head 21 and having a larger diameter than the body of the opening/closing actuator 20. Therefore, a phenomenon where the opening/closing actuator 20 being detached toward the inside of the vulcanization mold 1 shown in FIG. 1 may be prevented.

When no external force is applied to the opening/closing actuator 20, the head 21 protrudes into the vulcanization mold 1 shown in FIG. 1 due to the elastic force of the opening/closing drive spring 30. Therefore, the inside of the housing 10 is exposed to the inside of the vulcanization mold 1, and the inner space of the vulcanization mold 1 is communicated with the housing 10 and the vent hole 4, such that the air inside the vulcanization mold 1 may be smoothly discharged.

Referring to FIG. 1, when the bladder 3 is inflated by air pressure, the green case 2 is inflated by the inflated bladder 3 thus to come into contact with the head 21, and thereby starting to push the head 21. At this time, the opening/closing actuator 20 starts to be gradually inserted into the housing 10.

Figure 8:
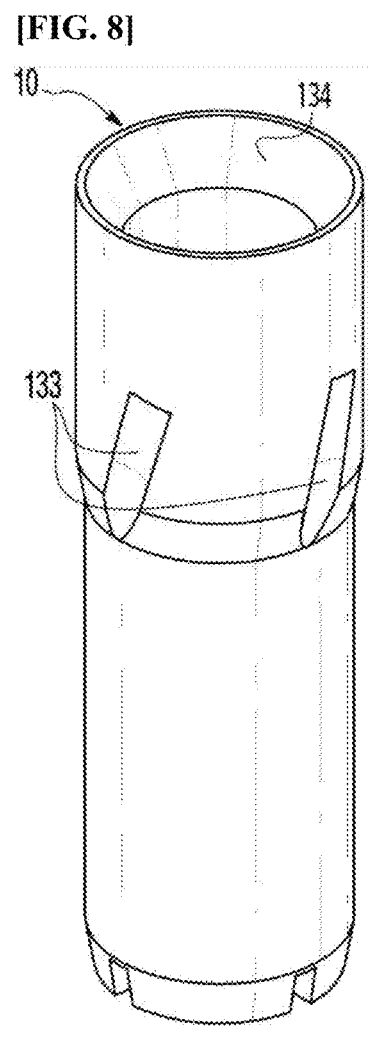

Referring to FIGS. 5 and 8, the head 21 may seal the vent hole 4 shown in FIG. 1 by being seated on a head seat surface 134 formed in an opening portion of a body rear end 13.

As can be seen through FIGS. 5 and 7, the opening/closing actuator 20 comes into contact with the green case 2 shown in FIG. 1 inside the housing 10, thereby sealing the vent hole. That is, before the green case 2 comes into contact, the air inside the vulcanization mold 1 may be exhausted through the vent hole 4, such that rubber of the material for manufacturing the green case 2 may be prevented from leaking while selectively exhausting the air.

Referring to FIG. 1, the vent hole 4 is a type of exhaust chamber formed in the vulcanization mold 1 so that the air remaining between the vulcanization mold 1 and the green case 2 can be effectively discharged.

However, as described above in the background art, if the the vent hole 4 has a large diameter, the air is discharged smoothly, but the rubber for manufacturing the green case 2 penetrates into the vent hole, thereby causing a hair-like defect called the "spew" to appear on the tire surface. This results in a deterioration in the appearance quality of the tire product. To solve this problem, a method of inserting the spring vent plug into the vent hole 4 is generally used.

However, the vent plug B of the prior art gradually becomes loose over time and may be detached from the vent hole 4. Accordingly, costs required for maintenance and replacement costs may be increased, and defects may also occur due to process interruption for maintenance or partial detachment problems occurring during the tire forming process.

To prevent these problems, in the vent plug 100 according to an embodiment of the present invention, the housing 10 includes a body front end 11 and the body rear end 13 which are formed on opposite sides in a longitudinal direction thereof, and an intermediate step 12 formed between the body front end 11 and the body rear end 13 to connect them with each other. The body front end 11 is first inserted into the vent hole 4, and then the body rear end 13 is inserted therein, such that the end of the body rear end 13 is installed so as to face the inside of the vulcanization mold 1 shown in FIG. 1.

In this case, the body rear end 13 is formed to have a larger diameter than the diameter of the vent hole 4, such that the body rear end 13 is installed in the form of being pressed and inserted into the vent hole 4 by forced fit. Accordingly, as the mold material for defining an outer circumference of the vent hole 4 expands, the body rear end 13 of the inserted housing 10 is pressed due to a residual stress, so the housing 10 and the vent hole 4 may be more firmly coupled.

Referring to FIG. 5, the housing 10 has a hole formed at an end of the body front end 11, whereby the opening/closing actuator 20 penetrates the hole formed in a surface facing the inside of the vent hole 4. Exhaust slits 112 which communicate the inside and the outside of the housing 10 may be formed at radially symmetrical positions around the hole.

Since there is a gap between the opening/closing actuator 20 and the hole, air may basically be exhausted through this gap. However, for more smooth exhaust, the exhaust slits 112 having a radially cut shape are formed at the end of the body front end 11, such that various gases inside the vulcanization mold that were exhausted along a center of the housing 10 may be quickly discharged radially through the exhaust slits 112 formed at the end of the body front end 11 of the housing 10.

In addition, air inflowing into the housing 10 from the inside of the vulcanization mold 1 through the body rear end 13 may be exhausted to the vent hole 4 through the hole and exhaust slits 112.

Referring to FIG. 6, the opening/closing actuator 20 has a communication slit 221 formed at an end portion corresponding to the above-described exhaust slits 112, and the communication slit 221 formed at a position corresponding to the exhaust slit 112 may be communicated with the exhaust slits 112.

Due to the communication slit 221 formed as described above, even if the hole at the end of the body front end 11 is blocked by the end of the opening/closing actuator 20, the air inside the housing 20 may be smoothly exhausted to the vent hole 4 through the communication slit 221 and the exhaust slits 112. Accordingly, even if the head 21 is spaced apart from the body rear end 13 to the maximum toward the inside of the vulcanization mold 1, the exhaust operation may be smoothly maintained.

Referring to FIGS. 8 and 9, the body rear end 13 may have a concave-convex structure formed on the outer circumference thereof to reinforce coupling between the body rear end 13 and the vent hole 4 in a circumferential direction.

Here, the concave-convex structure may be a tight fitting groove which is a groove formed in a predetermined length and inserted while a portion of an inner circumference of the vent hole 4 is raised due to a pressure difference generated in a process of the body rear end 13 being pressed and inserted into the vent hole 4.

That is, referring to FIGS. 1 and 5 together, in the process of forcibly fitting the body rear end 13 of the housing 10 into the vent hole 4, the material of the vulcanization mold 1 for defining the inner circumference of the vent hole 4 is pushed out by the body rear end 13 of the housing 10, and is pushed into the empty spaces, the tight fitting grooves 133, thereby forming a type of protruding trajectory. Accordingly, the housing 10 may be installed in the form in which the protruding trajectory and the tight fitting grooves 133 are tightly fitted to each other.

Referring to particularly FIGS. 8 and 9, the tight fitting grooves 133 are formed to be inclined at a predetermined angle with respect to the longitudinal direction of the housing 10 and the vent hole 4. Accordingly, in the process of the body rear end 13 of the housing 10 being pressed and inserted into the vent hole 4, the raised portion formed on the inner circumference of the vent hole 4 caused by the tight fitting grooves 133, i.e., the protruding trajectory, is formed in a spiral shape.

The raised portion, which is a trajectory protruding in the spiral shape, is formed in the process of being strongly pressed and inserted. Therefore, the raised portion, which is a trajectory formed on the inner circumference of the vent hole 4 of the vulcanization mold 1, exerts the residual stress in a direction to fill the tight fitting grooves 133 without any gap, and as if the spiral protruding trajectory is fitted to the tight fitting grooves 133, a strong screw coupling effect may be generated.

Referring to FIG. 8, in the intermediate step 12 formed between the body front end 11 and the body rear end 13 of the housing 10, a step surface defining the intermediate step 12 is formed to be inclined at a predetermined angle from a right angle with respect to the longitudinal direction of the housing 10.

That is, the intermediate step 12 is not formed at a right angle from a point where the body front end 11 ends to a point where the body rear end 13 starts, but is formed in a shape in which a cross-sectional diameter of the housing 10 is gradually increased.

Referring to FIG. 9, a starting point of the tight fitting groove 133 may be a point where the diameter of the intermediate step 12 starts to increase. Accordingly, at the moment when the housing 10 starts to be forcibly inserted into the vent hole 4, the cross-sectional diameter of the housing 10 starts to expand due to the body rear end 13, the material for manufacturing the vulcanization mold 1, which is pushed out as the inner circumference of the vent hole 4 expands, starts to flow into the tight fitting grooves 133.

Therefore, the material for defining the inner circumference of the vent hole 4 that fills the tight fitting grooves 133 are introduced into the tight fitting grooves 133 from the start of the forced fit. Accordingly, the forced fit process itself may be performed much more smoothly, while achieving more solid fitting.

In particular, since the tight fitting groove 133 is formed in the spiral direction, the raised trajectory of the mold inserted into the tight fitting grooves 133 becomes a direction that forms strong screw coupling. Therefore, a strong resistance to detachment may be formed with respect to the longitudinal direction of the vent hole 4, which is the direction where the housing 10 is detached.

In addition, the body rear end 13 of the housing 10 may have a concave-convex structure formed on an outer circumference thereof separately from the tight fitting grooves 133. In this case, as shown in FIG. 9, the concave-convex structure includes recess portions 131 formed at a predetermined angle on the outer circumference of the body rear end 13, and protruding portions 132 formed between the adjacent recess portions 131.

Here, the protruding portion 132 is not formed to protrude radially outwardly from the original outer circumference of the body rear end 13 of the housing 10, but is formed as if it is a relatively protruding shape due to the recess portions 131 formed on both sides of the protruding portion 132.

In particular, a diameter of the virtual circle connecting outer circumferences of the recess portion 131 is the smallest between the opposite ends of the body rear end 13. The diameter of the virtual circle is gradually increased toward the opposite ends of the body rear end 13, such that the diameters of the opposite ends, that is, a portion where the head 21 protrudes and a portion where the intermediate step 12 is formed and the virtual circle connecting the outer circumferences of the protruding portion 132 coincide with each other.

In other words, a point where the recess portion 131 is sunk the deepest is defined between the opposite ends of the body rear end 13. The depth of the recess portion 131 is decreased toward opposite ends of the body rear end 13, thereby at the opposite ends of the body rear end 13, i.e., at the connection point of the body rear end 13 and the intermediate step 12, or a portion where the head 21 of the opening/closing actuator 20 comes into contact, the recess portion 131 disappears, and the recess portion 131 and the protruding portion 132 form a single connected curved surface.

Therefore, in the forced fitting process of the housing 10, the material of the vulcanization mold 1 that is pushed out as the vent hole 4 expands is pushed back into the recess portions 131 due to the residual stress, and the recess portions 131 are filled with the material of the vulcanization mold 1.

Here, these recess portions 131 are smaller than the diameters of opposite ends of the body rear end 13, therefore, the material of the vulcanization mold 1 pushed into the recess portions 131 is also formed in a shape which defines a type of assembly structure to prevent the housing 10 from being detached from the vent hole 4.

In addition, in the vent plug 100 according to an embodiment of the present invention, the tight fitting grooves 133 are formed in the protruding portions 132 of the body rear end 13 of the above-described housing 10, such that the body rear end 13 of the housing 10 has one concave-convex structure defined by the recess portions 131 and the protruding portions 132, and another concave-convex structure defined by the tight fitting grooves 133. As a result, strong fitting may be doubly achieved.

In particular, although not shown in detail in the drawings, referring to FIG. 9, the formation direction of the recess portion 131 and the inclination direction of the tight fitting groove 133 coincide with each other, such that the recess portion 131 also forms a spiral coupling like the tight fitting groove 133, and thereby the coupling between the housing 10 and the vent hole 4 may be maintained very strongly.

Meanwhile, as shown in FIG. 10, the tight fitting groove 133 may have an extension section formed at an end thereof. Referring to FIG. 10, this extension section is a tight fitting reinforcement section 1332 formed to be inclined with respect to the housing 10 at an angle (an angle formed by a straight line b with a V axis) greater than an angle formed by the tight fitting groove 133 with the longitudinal direction of the housing 10 (an angle formed by a straight line a with the V axis).

The tight fitting reinforcement section 1332 forms a trajectory where the material for defining the inner circumference of the vent hole 4 of the vulcanization mold 1, which flows into the adhesion reinforcement grooves (133) in the force-fitting process, is raised while being bent at a larger angle with respect to the longitudinal direction of the vent hole 4.

Further, tight fitting groove 133 may have a width gradual expansion section 1331 formed at an end thereof opposite to the tight fitting reinforcement section 1332.

Therefore, the housing 10, which is significantly strengthened by the tight fitting grooves 133, and the vent hole 4 act as a stopper to thoroughly prevent detachment.

Accordingly, even if the vent plug 100 according to the present invention is used for a long period of time, it may remain installed in the vent hole 4, such that costs required for maintenance and costs required for replacement of consumables, as well as defects that may occur due to the vent plug becoming loose or detached during the process can be thoroughly prevented.

The present invention described above is not limited to the above-described embodiments and the accompanying drawings, and it will be apparent to persons skilled in the art to which the present invention pertains that various substitutions, modifications and changes are possible within the scope that does not depart from the technical spirit of the present invention.

DESCRIPTION OF REFERENCE NUMERALS

B: Vent plug of the prior art
1: Vulcanization mold
2: Green case
3: Bladder
4: Vent hole
10: Housing
11: Body front end
12: Intermediate step
13: Body rear end
20: Opening/closing actuator
21: Head
22: Extension tip
30: Opening/closing drive spring
100: Vent plug according to an embodiment of the present invention
111: Tip end
112: Exhaust slit
131: Recess portion
132: Protruding portion
133: Tight fitting groove
134: Head seat surface
221: Flue slit
1331: Width gradual expansion section
1332: Tight fitting reinforcement section

What is claimed is:

1. A vent plug for vulcanization installed in a vent hole formed in a vulcanization mold for molding a green tire and configured to discharge air and prevent a raw rubber of the green tire from inflowing, comprising:
   a housing inserted into the vent hole;
   an actuator installed inside the housing; and
   an opening/closing drive spring installed inside the housing to provide an elastic force to the actuator,
   wherein the actuator has a head formed at one end thereof, and
   one end of opposite ends of the spring is caught by a step formed on a bottom inside the housing, and the other end is caught by the head, whereby, when the actuator is inserted into the housing, the opening/closing drive spring pushes a portion of the actuator to an outside of the housing;
   wherein the housing comprises: a body front end and a body rear end which are formed in a longitudinal direction thereof; and an intermediate step which connects the body front end and the body rear end,
   the body front end is first inserted into the vent hole, and then the body rear end is inserted therein, such that the end of the body rear end is installed so as to face the inside of the vulcanization mold, and
   the body rear end is formed to have a larger diameter than the diameter of the vent hole, such that the body rear end is pressed and inserted into the vent hole by forced fit
   wherein the body rear end has a concave-convex structure formed on an outer circumference thereof to reinforce coupling between the body rear end and the vent hole in a circumferential direction;
   wherein the concave-convex structure is tight fitting grooves which are grooves formed in a predetermined length and inserted while a portion of an inner circumference of the vent hole is raised due to a pressure difference generated in a process of the body rear end being pressed and inserted into the vent hole;
   wherein the tight fitting grooves are formed to be inclined at a predetermined angle with respect to the longitudinal direction of the housing and the vent hole, such that in the process of the body rear end of the housing being pressed and inserted into the vent hole, a trajectory due to the raised portion formed on an inner circumference of the vent hole caused by the tight fitting grooves is formed in a spiral shape;
   wherein in the intermediate step formed between the body front end and the body rear end of the housing, a step surface defining the intermediate step is formed to be inclined at a predetermined angle from a right angle with respect to the longitudinal direction of the housing, such that the intermediate step is formed in a shape in which a diameter is gradually increased from a point where the body front end ends to a point where the body rear end starts, and a starting point of the tight fitting groove is a point where the diameter of the intermediate step starts to increase, and wherein the tight fitting groove is formed in a protruding portion, the tight fitting groove has an extension section formed at an end thereof, and the extension section is a tight fitting reinforcement section formed to be inclined with respect to the housing at an angle greater than an angle formed by the tight fitting groove with the housing.

2. The vent plug for vulcanization according to claim 1, wherein the concave-convex structure includes recess portions formed at a predetermined angle on the outer circumference of the body rear end, and protruding portions formed between the adjacent recess portions, and a diameter of a virtual circle connecting outer circumferences of the recess portion is the smallest between the opposite ends of the body rear end, and the diameter of the virtual circle is gradually increased toward the opposite ends of the body rear end, such that the diameters of the opposite ends coincide with the virtual circle connecting the outer circumferences of the protruding portion.

3. The vent plug for vulcanization according to claim 1, wherein the housing has a hole at an end of the body front end, wherein the actuator penetrates the hole formed in a surface facing the inside of the vent hole, and exhaust slits which communicate the inside and the outside of the housing are formed at radially symmetrical positions around the hole, whereby air inflowing into the housing from the inside of the vulcanization mold through the body rear end is exhausted to the vent hole through the hole and the exhaust slits.

4. The vent plug for vulcanization according to claim 3, wherein the actuator has a communicating slit formed at a position corresponding to the exhaust slits, whereby, even if the hole is blocked by the end of the actuator, the air inside the housing is exhausted to the vent hole through the communicating slit and the exhaust slits.

* * * * *